US012770141B2

(12) United States Patent
Liu

(10) Patent No.: US 12,770,141 B2
(45) Date of Patent: Oct. 20, 2026

(54) CROSS-CHAIN TRANSACTION PROCESSING METHOD AND APPARATUS, ELECTRONIC DEVICE, AND STORAGE MEDIUM

(71) Applicant: Tencent Technology (Shenzhen) Company Limited, Shenzhen (CN)

(72) Inventor: Changhui Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 179 days.

(21) Appl. No.: 18/135,542

(22) Filed: Apr. 17, 2023

(65) Prior Publication Data

US 2023/0259930 A1 Aug. 17, 2023

Related U.S. Application Data

(63) Continuation of application No. PCT/CN2022/099545, filed on Jun. 17, 2022.

(30) Foreign Application Priority Data

Jul. 27, 2021 (CN) ........................ 202110853182.7

(51) Int. Cl.
*G06Q 20/38* (2012.01)
*G06Q 20/40* (2012.01)

(52) U.S. Cl.
CPC ....... *G06Q 20/389* (2013.01); *G06Q 20/3825* (2013.01); *G06Q 20/401* (2013.01)

(58) Field of Classification Search
CPC ... H04L 9/50; G06F 16/2379; G06Q 2220/00; G06Q 20/065
See application file for complete search history.

(56) References Cited

U.S. PATENT DOCUMENTS 10,924,466 B2 * 2/2021 Biyani .................... G06F 21/64
2019/0251199 A1 * 8/2019 Klianev ................ G06Q 40/04
(Continued)

FOREIGN PATENT DOCUMENTS

CN 108269190 A 7/2018
CN 110266655 A 9/2019
(Continued)

OTHER PUBLICATIONS

Tencent Technology, Japanese Office Action, JP Patent Application No. 2023-548555, My 29, 2024, 14 pgs.
(Continued)

*Primary Examiner* — Patrick McAtee
*Assistant Examiner* — Sima Asgari
(74) *Attorney, Agent, or Firm* — Morgan, Lewis & Bockius LLP

(57) ABSTRACT

A cross-chain transaction processing method and apparatus, an electronic device, and a storage medium are provided, which belong to the field of blockchain technologies. The method includes: receiving a cross-chain transaction request of a terminal; running a first service contract on a first blockchain based on the cross-chain transaction request; executing, on the first blockchain through the first service contract, a first transaction event of a cross-chain transaction, running a first cross-chain contract on the first blockchain, and determining to execute, on a second blockchain, a second transaction event of the cross-chain transaction; storing first cross-chain transaction data to the first blockchain through the first service contract; obtaining second cross-chain transaction data from the second blockchain; and sending a transaction completion response to the terminal through the first service contract and the first cross-chain contract.

8 Claims, 6 Drawing Sheets

(56) References Cited

U.S. PATENT DOCUMENTS

| | | | | |
|---|---|---|---|---|
| 2019/0340267 | A1* | 11/2019 | Vo | G06F 16/2365 |
| 2019/0347657 | A1* | 11/2019 | Guo | G06Q 20/389 |
| 2020/0177391 | A1* | 6/2020 | Qiu | H04L 9/3239 |
| 2020/0274695 | A1 | 8/2020 | Qiu | |
| 2020/0364212 | A1 | 11/2020 | Cho et al. | |
| 2021/0120083 | A1 | 4/2021 | Kwun et al. | |
| 2021/0216651 | A1 | 7/2021 | Duan et al. | |
| 2021/0326813 | A1* | 10/2021 | Wang | G06F 16/2379 |
| 2023/0013119 | A1* | 1/2023 | Gaur | G06Q 20/02 |

FOREIGN PATENT DOCUMENTS

| | | | | |
|---|---|---|---|---|
| CN | 110442652 | A | 11/2019 | |
| CN | 111681003 | A * | 9/2020 | G06F 16/27 |
| CN | 112005264 | A | 11/2020 | |
| CN | 112330326 | A | 2/2021 | |
| CN | 112446785 | A | 3/2021 | |
| CN | 112861190 | A | 5/2021 | |
| CN | 112948153 | A | 6/2021 | |
| CN | 112994892 | A | 6/2021 | |
| JP | 2020145681 | A | 9/2020 | |
| JP | 2021520539 | A | 8/2021 | |
| WO | WO 2019211225 | A1 | 11/2019 | |
| WO | WO 2021012812 | A1 | 1/2021 | |
| WO | WO 2021042713 | A1 | 3/2021 | |

OTHER PUBLICATIONS

Tencent Technology, ISR, PCT/CN2022/099545, Sep. 6, 2022, 2 pgs.

Tencent Technology, WO, PCT/CN2022/099545, Sep. 6, 2022, 4 pgs.

Tencent Technology, IPRP, PCT/CN2022/099545, Jan. 18, 2024, 5 pgs.

Tencent Technology, Extended European Search Report, EP Patent Application No. 22848107.3, Sep. 13, 2024, 14 pgs.

* cited by examiner

CROSS-CHAIN TRANSACTION PROCESSING METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2022/099545, entitled "CROSS-CHAIN TRANSACTION PROCESSING METHOD AND APPARATUS, ELECTRONIC DEVICE, AND STORAGE MEDIUM" filed on Jun. 17, 2022, which claims priority to Chinese Patent Application No. 202110853182.7, entitled "CROSS-CHAIN TRANSACTION PROCESSING METHOD AND APPARATUS, ELECTRONIC DEVICE, AND STORAGE MEDIUM" filed on Jul. 27, 2021, the entire contents of which are incorporated herein by reference.

FIELD OF THE TECHNOLOGY

This application relates to the field of blockchain technologies, and in particular, to a cross-chain transaction processing method and apparatus, an electronic device, and a storage medium.

BACKGROUND OF THE DISCLOSURE

With development of a blockchain technology, the blockchain technology has been widely used in various industries. In each industry, a blockchain system may be constructed according to its own need, so as to store own assets by using the constructed blockchain system.

SUMMARY

Embodiments of this application provide a cross-chain transaction processing method and apparatus, an electronic device, and a storage medium. The technical solutions are as follows.

An aspect provides a cross-chain transaction processing method, performed by a blockchain system including a first blockchain and a second blockchain, and the method comprising:

- receiving a cross-chain transaction request of a terminal, the cross-chain transaction request instructing a cross-chain transaction to be performed between the first blockchain and the second blockchain;
- running a first service contract on the first blockchain based on the cross-chain transaction request;
- executing, on the first blockchain through the first service contract, a first transaction event of the cross-chain transaction, running a first cross-chain contract on the first blockchain, and executing, on the second blockchain, a second transaction event of the cross-chain transaction;
- storing first cross-chain transaction data to the first blockchain through the first service contract, the first cross-chain transaction data indicating that the first transaction event is already executed on the first blockchain and that the second transaction event is already executed on the second blockchain; and
- sending a transaction completion response to the terminal through the first service contract and the first cross-chain contract, the transaction completion response indicating that the cross-chain transaction is already completed.

Another aspect provides a cross-chain transaction processing method, performed by a second node device in a blockchain system. A first blockchain and a second blockchain are configured in the blockchain system. The method includes:

- obtaining first cross-chain transaction data from the first blockchain, the first cross-chain transaction data indicating that a first transaction event of a cross-chain transaction is already executed on the first blockchain and that a second transaction event of the cross-chain transaction is already executed on the second blockchain;
- running a second cross-chain contract on the second blockchain based on the first cross-chain transaction data, the second cross-chain contract indicating a fourth execution manner for the cross-chain transaction on the second blockchain;
- storing the first cross-chain transaction data to the second blockchain through the second cross-chain contract, and running a second service contract on the second blockchain, the second service contract indicating a third execution manner for the cross-chain transaction on the second blockchain; and
- executing, on the second blockchain through the second service contract, the second transaction event, continuing to run the second cross-chain contract, and storing second cross-chain transaction data to the second blockchain, the second cross-chain transaction data indicating that the second transaction event is already executed on the second blockchain.

Another aspect provides a blockchain system implemented on a computer network system, the blockchain system including a first blockchain and a second blockchain. The blockchain system is configured to implement the cross-chain transaction processing method as described in any one of the foregoing aspects.

Another aspect provides a non-transitory computer-readable storage medium. The non-transitory computer-readable storage medium stores at least one piece of computer program. The at least one piece of computer program is loaded and executed by a computer network system acting as a blockchain system including a first blockchain and a second blockchain to implement the cross-chain transaction processing method as described in any one of the foregoing aspects.

Another aspect provides a computer program. The computer program includes program code. The program code is stored in a non-transitory computer-readable storage medium. A processor of an electronic device reads the program code from the computer-readable storage medium. The processor executes the program code to enable the electronic device to perform the method provided in any one of the foregoing aspects.

BRIEF DESCRIPTION OF THE DRAWINGS

In order to describe the technical solutions in the embodiments of this application more clearly, the drawings required to be used in descriptions about the embodiments will be simply described below.

DESCRIPTION OF EMBODIMENTS

Different industries may provide different services for users, and a cross-chain interoperability technology emerges to implement asset transfer between different services. As a strong push to large-scale development of blockchain to network effects, the cross-chain interoperability technology may promote cooperation between chains of different blockchain systems, and gradually becomes a new hotspot of application requirements.

Current cross-chain interoperability technologies mainly include hash-locking, notary schemes, sidechains/relays, and other technologies. For the current cross-chain interoperability technologies, a terminal needs to process a series of complex cross-chain transactions such as consistency of cross-chain events and verification of the cross-chain events. This increases a service burden of the terminal.

The following first defines abbreviations or key terms involved in the embodiments of this application.

Smart contract: as a computerized protocol, it may execute a term of a specific contract, is implemented through code that is deployed on a shared ledger and that is executed when a specific condition is satisfied, and is used for completing an automatic transaction according to practical service requirement code, for example, querying a logistics state of a commodity purchased by a buyer, or transferring electronic money of the buyer to an address of a merchant after the buyer signs and receives the commodity. Certainly, the smart contract is not limited to execution of a transaction contract, and may also execute a contract for processing received information.

Blockchain: it includes a series of blocks that are successive in generated time sequence. A new block will not be removed once added to the blockchain. Record data submitted by a node in a blockchain system is recorded in the block.

Interoperability: it is an ability of exchanging information between two or more systems and applications and using the exchanged information.

Cross-chain: it implements interoperability between a plurality of blockchains. Cross-chain is a kind of interoperability.

Figure 1:
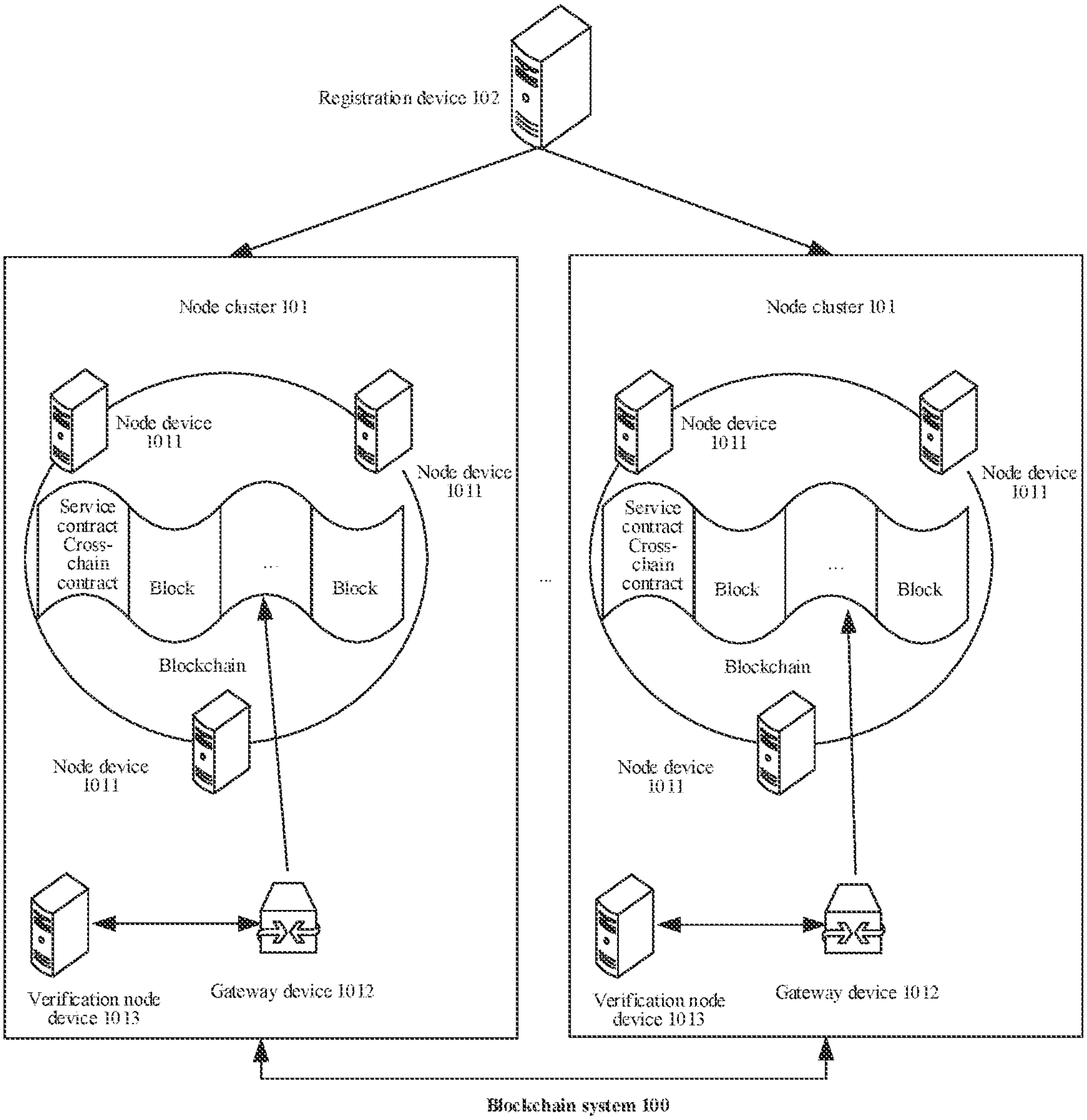
FIG. 1 is a schematic diagram of a blockchain system according to an embodiment of this application.

FIG. 1 is a schematic diagram of a blockchain system according to an embodiment of this application. Referring to FIG. 1, the blockchain system 100 includes a plurality of node clusters 101. Each node cluster 101 corresponds to a service. Different node clusters 101 may correspond to the same or different services. For example, one node cluster is configured to provide a service for a payment transaction of a first application program (for example, Alipay), while another node cluster is configured to provide a service for a payment transaction of a second application program (for example, WeChat).

Each node cluster 101 is configured to process a transaction event involved in the corresponding service. At least one blockchain is configured in each node cluster 101. Each blockchain stores transaction data of the transaction event of the corresponding service. The transaction data of the same service includes co-chain transaction data and cross-chain transaction data. The co-chain transaction data indicates the transaction event executed on the blockchain of the current node cluster for the service of the current node cluster (or a co-chain transaction). The cross-chain transaction data indicates a cross-chain transaction event executed on the blockchain of the current node cluster for a cross-chain service (or a cross-chain transaction) between different node clusters.

In order to make processing of the cross-chain service transparent and traceable, in a possible implementation, each blockchain stores a service contract and a cross-chain contract. For example, the service contract and the cross-chain contract are stored to a genesis block of the blockchain (that is, a first block of the blockchain). The service contract is a smart contract of a service layer. The service contract has a function of reading/writing state data of the current chain (that is, the blockchain on which the service contract is), and when the cross-chain transaction is processed, may further call the cross-chain contract on the same blockchain to process the cross-chain service. The cross-chain contract is a smart contract for processing the cross-chain transaction, and may process the cross-chain transaction as an agency contract of the service contract on the same chain. The cross-chain contract may be called (that is, in-chain contract calling) by the service contract on the current chain to determine, based on the cross-chain transaction involving the current chain, a transaction event to be executed on a peer chain (that is, a blockchain in another node cluster involved in the cross-chain transaction), verify whether cross-chain transaction data stored to the peer chain is valid, call back the service contract on the current chain, roll back the cross-chain transaction data, and realize other functions. The cross-chain contract is a decision maker in an entire cross-chain process, and is executed in public on the chain as a smart contract, so as to implement the cross-chain service with a plurality of participants (decentralized).

In a possible implementation, each node cluster 101 includes a plurality of node devices 1011. The blockchain configured in each node cluster 101 is maintained by the node device 1011 in each node cluster 101. Each node device 1011 in the blockchain system 100 may be a user-side terminal or a server. The terminal is also referred to as an intelligent terminal or a mobile intelligent terminal, and is a kind of device that uses rich human-computer interaction modes, has an Internet access capability and a high processing capability, and usually carries various operating systems. In some embodiments, a type of the mobile intelligent terminal includes but is not limited to a smartphone, a tablet computer, an in-vehicle terminal, a handheld game console, and the like. The server may be a server cluster including one or more computer devices.

In a possible implementation, each node cluster 101 further includes a gateway device 1012. The gateway device 1012 is an external interface of the corresponding node cluster, and is responsible for transmission of cross-chain transaction data between different node clusters. In some embodiments, the gateway device involved in this application may also be referred to as a cross-chain gateway.

In a possible implementation, each node cluster 101 further includes a verification node device 1013. A verification node device 1013 may prove validity of cross-chain transaction data on the blockchain in the corresponding node cluster. In some embodiments, as a relay role in the cross-chain process, the gateway device 1012 calls the verification node device 1013 of the corresponding node cluster to prove the validity of the cross-chain transaction data on the blockchain in the node cluster. It is to be noted that the verification node device 1013 is an optional device. In some embodiments, the validity of the cross-chain transaction data is not proved, and no verification node device 1013 is included.

In order to facilitate management on different node clusters 101 in the blockchain system 100, in a possible implementation, the blockchain system 100 further includes a registration device 102. An identifier of the blockchain configured in each node cluster 101 and an identifier of the service corresponding to each node cluster may be registered in the registration device. Alternatively, each user in each node cluster may register a unified blockchain account (that is, an account on the blockchain) in the registration device 102. Blockchain accounts registered by a user in different node clusters 101 belong to different blockchains so as to record assets of the user and asset transfer and asset modification conditions of the user on the corresponding blockchains. In a possible implementation, the gateway device 1012 may further query, on the registration device 102, the blockchain account of the user and the identifier of the blockchain that the blockchain account belongs to. It is to be noted that the registration device 102 is an optional device. For example, if the blockchains configured in different clusters in the blockchain system 100 do not need to be managed uniformly or the blockchain accounts do not need to be registered uniformly, the blockchain system 100 may not include the registration device 102.

Figure 2:
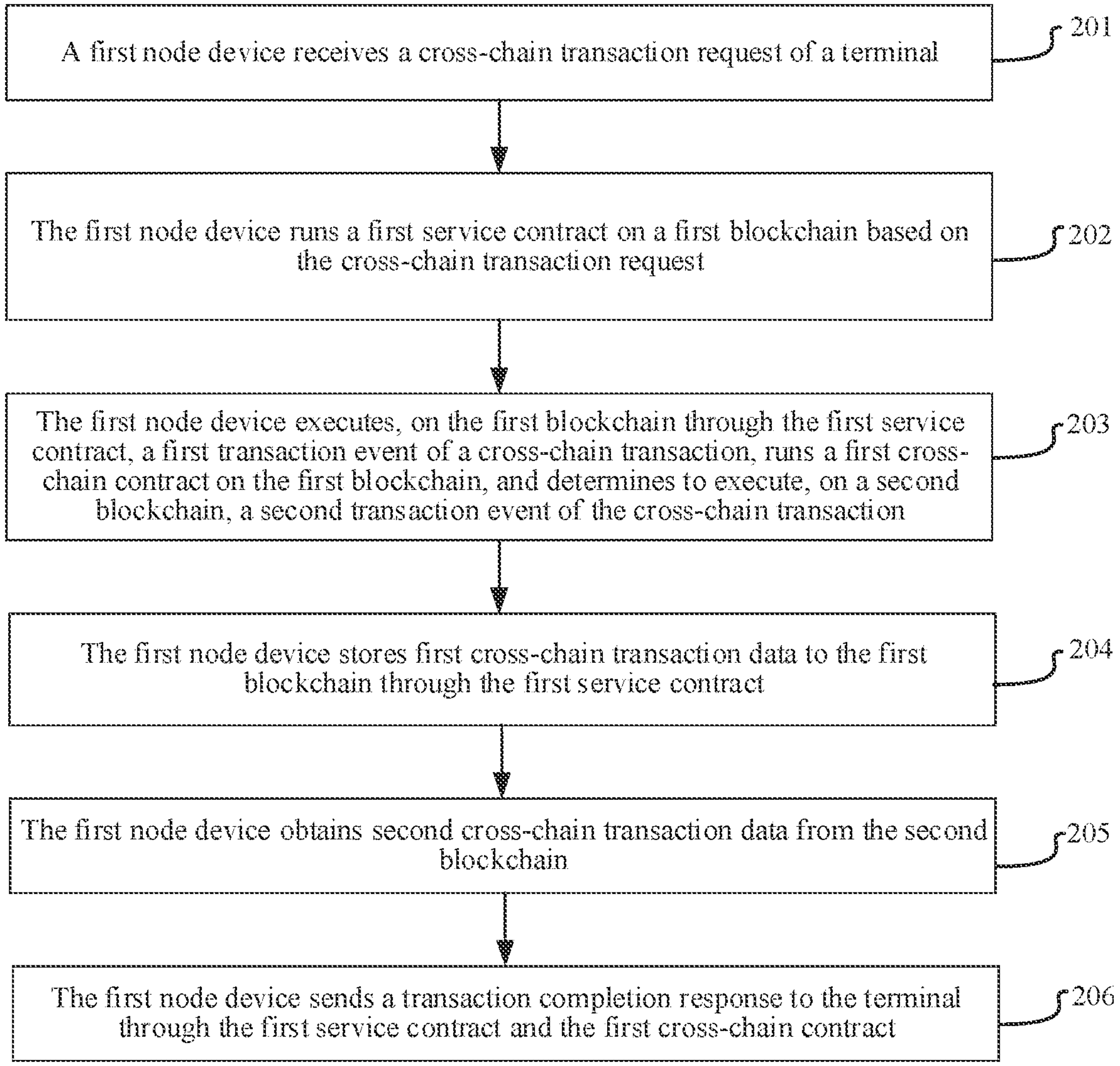
FIG. 2 is a schematic flowchart of a cross-chain transaction processing method according to an embodiment of this application.

In order to further describe a process in which a node device in the blockchain system processes a cross-chain transaction, reference is made to a flowchart of a cross-chain transaction processing method according to an embodiment of this application in FIG. 2. The method is performed by a first node device in the blockchain system. A first blockchain and a second blockchain are configured in the blockchain system.

201: The first node device receives a cross-chain transaction request of a terminal, the cross-chain transaction request instructing a cross-chain transaction to be performed between the first blockchain and the second blockchain.

The first node device is any node device in a first node cluster in the blockchain system. The first node cluster is any node cluster in the blockchain system. The first blockchain is deployed in the first node cluster. The terminal may be the first node device, or may be an electronic device other than the first node device.

The cross-chain transaction request includes transaction information of the cross-chain transaction, an identifier of a first service contract, and an identifier of a second service contract on the second blockchain. The cross-chain transaction may be a transaction in which a cross-chain operation is performed on the first blockchain and the second blockchain. For example, the cross-chain transaction is to transfer a target quantity of virtual resources in a first account on the first blockchain to a second account on the second blockchain. Alternatively, the cross-chain transaction is to synchronously modify data on the first blockchain and the second blockchain. The cross-chain transaction is not limited in this embodiment of this application.

The transaction information of the cross-chain transaction indicates the cross-chain transaction. For example, if the cross-chain transaction is to transfer the target quantity of virtual resources in the first account on the first blockchain to the second account on the second blockchain, the transaction information includes a resource transfer-out account, a resource transfer-in account, and a resource transfer amount. The resource transfer-out account is the first account, the resource transfer-in account is the second account, and the resource transfer amount is the target quantity. For another example, if the cross-chain transaction is to synchronously modify the data on the first blockchain and the second blockchain, the transaction information includes positions of to-be-modified data on the first blockchain and the second blockchain and modified data of the to-be-modified data on the first blockchain and the second blockchain.

In a possible implementation, the cross-chain transaction includes two transaction events, that is, a transaction event for the first blockchain and a transaction event for the second blockchain. After the two transaction events are successfully executed on the corresponding blockchains, the cross-chain transaction is completed. For ease of description, the transaction event of the cross-chain transaction for the first blockchain is denoted as a first transaction event, and the transaction event of the cross-chain transaction for the second blockchain is denoted as a second transaction event. For example, if the cross-chain transaction is to transfer the target quantity of virtual resources in the first account on the first blockchain to the second account on the second blockchain, the first transaction event is to deduct the target quantity of virtual resources from the first account, and the second transaction event is to add the target quantity of virtual resources to the second account.

A service contract on a blockchain indicates a processing logic for processing a cross-chain transaction on the current chain (that is, the blockchain on which the service contract is). The processing logic includes, for a cross-chain transaction initiated on the current chain, executing, on the current chain, a transaction event of the cross-chain transaction for the current chain, calling a cross-chain contract on the current chain to obtain a transaction event of the cross-chain transaction for a peer chain (that is, a blockchain involved in the cross-chain transaction other than the current chain, or a target chain), and storing cross-chain transaction data of the cross-chain transaction. The processing logic further includes, for a cross-chain transaction initiated on the peer chain, receiving calling for the cross-chain contract on the current chain, and executing, on the current chain, a transaction event of the cross-chain transaction for the current chain. Each processing logic indicated by the service contract is implemented by program code (or a computer program) in the service contract. Different processing logics may correspond to different program code.

An identifier of a service contract indicates the service contract. The identifier of the service contract may be a name of the service contract. For example, the first service contract is a service contract on the first blockchain, and the identifier of the first service contract indicates the first service contract. The second service contract is a service contract on the second blockchain, and the identifier of the second service contract indicates the second service contract.

202: The first node device runs the first service contract on the first blockchain based on the cross-chain transaction request, the first service contract indicating a first execution manner for the cross-chain transaction on the first blockchain.

The second blockchain is a blockchain configured in a second node cluster in the blockchain system. The second node cluster is any node cluster other than the first node cluster in the blockchain system.

The first service contract is the service contract on the first blockchain. Since the cross-chain transaction request is received by the first node device, it is considered that the cross-chain transaction is a cross-chain transaction initiated on the first blockchain. The first execution manner is implemented by a processing logic, related to the cross-chain transaction initiated on the current chain, in the first service contract. The first execution manner includes executing, on the first blockchain, the transaction event of the cross-chain transaction for the first blockchain, calling a cross-chain contract on the first blockchain to obtain the transaction event of the cross-chain transaction for the second blockchain, and storing cross-chain transaction data of the cross-chain transaction to the first blockchain. In a possible implementation, the first execution manner further includes returning a processing result of the cross-chain transaction to the terminal.

203: The first node device executes, on the first blockchain through the first service contract, the first transaction event of the cross-chain transaction, runs a first cross-chain contract on the first blockchain, and determines to execute, on the second blockchain, the second transaction event of the cross-chain transaction, the first cross-chain contract indicating a second execution manner for the cross-chain transaction on the first blockchain.

A cross-chain contract on a blockchain indicates a processing logic, related to a peer chain, in a cross-chain transaction. The processing logic includes, for a cross-chain transaction initiated on the current chain, determining a transaction event of the cross-chain transaction for the peer chain.

In a possible implementation, the processing logic further includes, for the cross-chain transaction initiated on the current chain, verifying validity of cross-chain transaction data of the cross-chain transaction on the peer chain, and calling a service contract on the current chain to return a processing result of the cross-chain transaction to the terminal. It is an optional step to verify the validity of the cross-chain transaction data of the cross-chain transaction on the peer chain. The processing logic further includes, for a cross-chain transaction initiated on the peer chain, verifying validity of cross-chain transaction data of the cross-chain transaction on the peer chain, storing, on the current chain, the cross-chain transaction data of the cross-chain transaction on the peer chain, calling the service contract on the current chain to execute a transaction event of the cross-chain transaction for the current chain, and storing, on the current chain, cross-chain transaction data of the transaction event of the cross-chain transaction for the current chain. It is optional to verify the validity of the cross-chain transaction data of the cross-chain transaction on the peer chain. The processing logic indicated by the cross-chain contract is implemented by program code (or a computer program) in the cross-chain contract. Different processing logics may correspond to different program code.

The first cross-chain contract is a cross-chain contract on the first blockchain. The second execution manner is implemented by a processing logic, related to the cross-chain transaction initiated on the current chain, in the first cross-chain contract. The second execution manner includes determining to execute, on the blockchain, the second transaction event of the cross-chain transaction, verifying validity of the cross-chain transaction data of the cross-chain transaction on the second blockchain, and calling the first service contract to return the processing result of the cross-chain transaction to the terminal.

204: The first node device stores first cross-chain transaction data to the first blockchain through the first service contract, the first cross-chain transaction data indicating that the first transaction event is already executed on the first blockchain and that the second transaction event is already executed on the second blockchain.

The first cross-chain transaction data is cross-chain transaction data of the cross-chain transaction. In some embodiments, the first cross-chain transaction data includes a processing result of the first transaction event, the identifier of the second service contract, and event information of the second transaction event. A processing result of a transaction event is a first processing result or a second processing result. The first processing result indicates that the transaction event is already executed on a blockchain and that the transaction event is successfully executed. For example, the transaction event is to deduct the target quantity of virtual resources from the first account. If the target quantity of virtual resources is already deducted from the first account, the transaction event is successfully executed. In some embodiments, the first processing result includes event information of the transaction event and a success identifier. The event information is used for indicating the transaction event, and includes an event parameter of the transaction event. For example, if the transaction event is to deduct the target quantity of virtual resources from the first account, the event parameter includes information about a resource transfer-out party and a to-be-transferred resource quantity. The success identifier indicates that the transaction event is successfully executed.

The second processing result indicates that the transaction event is already executed on a blockchain and the transaction event fails to be executed. For example, the transaction event is to deduct the target quantity of virtual resources from the first account. If a quantity of virtual resources in the first account is less than the target quantity, virtual resources in the first account are not enough for deduction of the target quantity of virtual resources, and the transaction event fails to be executed. In some embodiments, the second processing result includes event information of the transaction event and a failure identifier. The failure identifier indicates that the transaction event fails to be executed.

In a possible implementation, the first cross-chain transaction data further includes an identifier of the second blockchain and the identifier of the second service contract on the second blockchain. In a possible implementation, the first cross-chain transaction data further includes an identifier of target program code in the second service contract. The target program code is used for implementing the second transaction event. Event information of the second transaction event is an input parameter of the target program code.

205: The first node device obtains second cross-chain transaction data from the second blockchain, the second cross-chain transaction data being obtained based on the first cross-chain transaction data, and the second cross-chain transaction data indicating that the second transaction event is already executed on the second blockchain.

The second cross-chain transaction data includes a processing result of the second transaction event.

206: The first node device sends a transaction completion response to the terminal through the first service contract and the first cross-chain contract, the transaction completion response indicating that the cross-chain transaction is already completed.

The transaction completion response includes the transaction information of the cross-chain transaction.

According to the method provided in this embodiment of this application, the node device in the blockchain system runs the service contracts and the cross-chain contracts on the blockchains to perform the cross-chain transaction when receiving the cross-chain transaction request of the terminal, and returns the transaction completion response to the terminal after the cross-chain transaction is completed. In a processing process of the cross-chain transaction, the terminal requests to perform the cross-chain transaction and receives the processing result of the cross-chain transaction, without caring about a specific processing process of the cross-chain transaction. Therefore, a service burden of the terminal is reduced.

Figure 3:
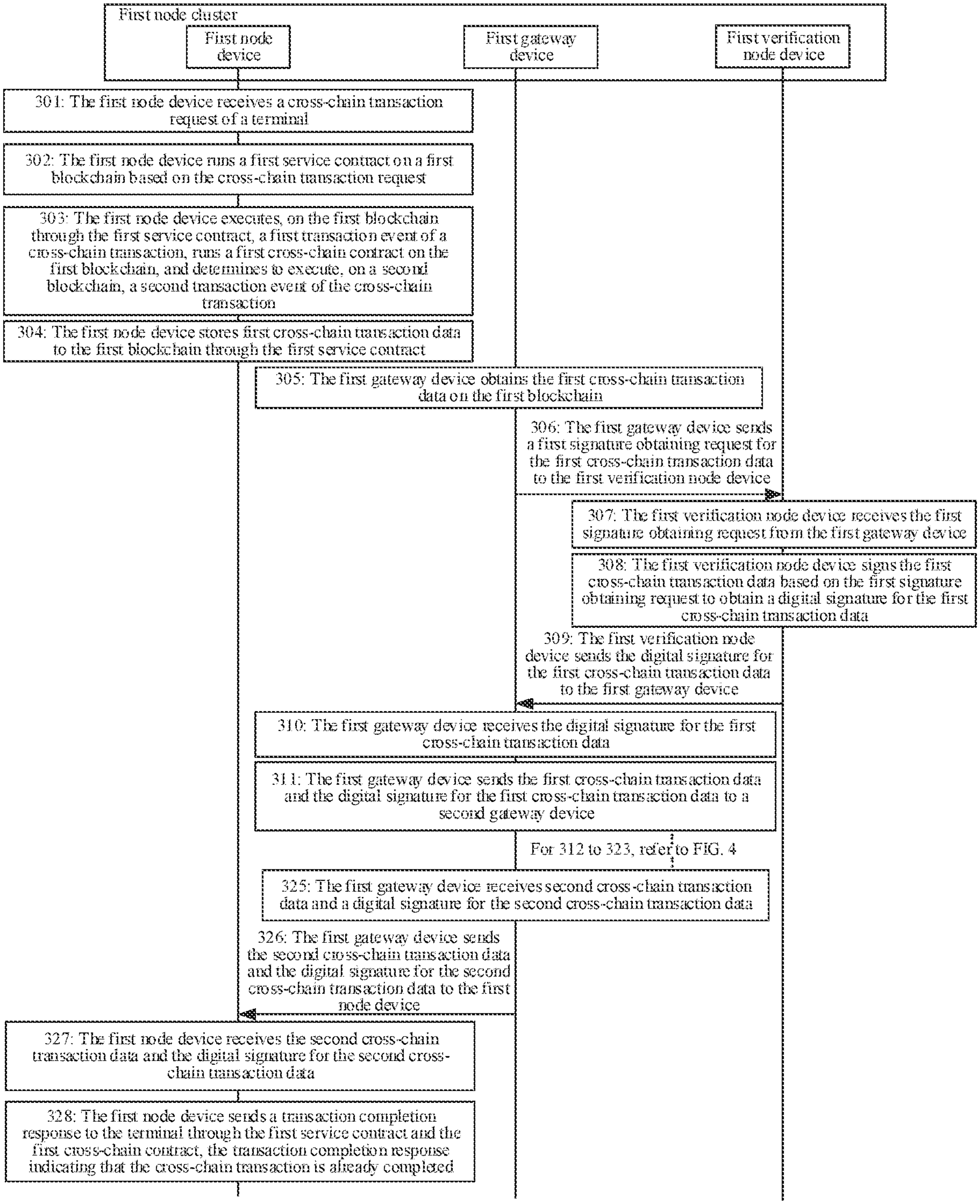
FIG. 3 is a flowchart of processing a cross-chain transaction r a first node set according to an embodiment of this application.

In order to further describe an interaction process of node devices in different node clusters in a process of processing a cross-chain service between the first node cluster and the second node cluster, reference is made to a flowchart of a cross-chain transaction processing method according to an embodiment of this application in FIG. 3.

301: A first node device receives a cross-chain transaction request of a terminal, the cross-chain transaction request instructing a cross-chain transaction to be performed between the first blockchain and the second blockchain.

In a possible implementation, a service application is installed in the terminal. A user logs on to the service application in the terminal by using a first account, and issues an instruction of performing the cross-chain transaction to the service application. After receiving the instruction, the service application generates the cross-chain transaction request, and sends the cross-chain transaction request to the terminal.

The terminal may be the first node device, or a device other than the first node device. If the terminal is the device other than the first node device, the terminal sends the cross-chain transaction request to the first node device, and accordingly, the first node device receives the cross-chain transaction request from the terminal. If the terminal is the first node device, the first node device receives the cross-chain transaction request sent by the service application.

302: The first node device runs a first service contract on the first blockchain based on the cross-chain transaction request, the first service contract indicating a first execution manner for the cross-chain transaction on the first blockchain.

After the cross-chain transaction request is received, the first node device is triggered to obtain the first service contract from the local first blockchain, input the cross-chain transaction request to the first service contract as an input parameter of the first service contract, and run the first service contract.

303: The first node device executes, on the first blockchain through the first service contract, a first transaction event of the cross-chain transaction, runs a first cross-chain contract on the first blockchain, and determines to execute, on the second blockchain, a second transaction event of the cross-chain transaction, the first cross-chain contract indicating a second execution manner for the cross-chain transaction on the first blockchain.

In a running process of the first service contract, the first node device determines the first transaction event of the cross-chain transaction based on transaction information of the cross-chain transaction in the cross-chain transaction request, and executes the first transaction event on the first blockchain to obtain a processing result of the first transaction event. In some embodiments, if the first transaction event is successfully, executed, the processing result of the first transaction event is a first processing result; or if the first transaction event fails to be executed, the processing result of the first transaction event is a second processing result.

In the running process of the first service contract, when the cross-chain transaction request is input to the first service contract, the first service contract is triggered to call the first cross-chain contract on the first blockchain. When calling the first cross-chain contract on the first blockchain, the first node device obtains the first cross-chain contract from the first blockchain, inputs the transaction information of the cross-chain transaction to the first cross-chain contract as an input parameter, and runs the first cross-chain contract.

In a running process of the first cross-chain contract, the first node device determines, based on the transaction information, to execute, on the second blockchain, the second transaction event of the cross-chain transaction. After determining the second transaction event, the first node device returns event information of the second transaction event to the first service contract.

In a possible implementation, each blockchain in the blockchain system stores blockchain information of each blockchain in the blockchain system. In a possible implementation, a genesis block in each blockchain stores the blockchain information of each blockchain in the blockchain system. For another example, a cross-chain contract or a service contract on each blockchain stores the blockchain information of each blockchain in the blockchain system. Blockchain information of a blockchain includes an identifier of a node set that the blockchain belongs to and an identifier of the blockchain. In some embodiments, the blockchain information of each blockchain further includes an identifier of the service contract on each blockchain and an identifier of program code (or a computer program) in the service contract for executing a transaction event of a cross-chain transaction.

In a possible implementation, in the running process of the first cross-chain contract, the first node device may further query, based on an identifier of a second service contract and the second transaction event, blockchain information of the second blockchain stored on the first blockchain to determine target program code in the second service contract for implementing the second transaction event, and return an identifier of the target program code to the first service contract.

304: The first node device stores first cross-chain transaction data to the first blockchain through the first service contract, the first cross-chain transaction data indicating that the first transaction event is already executed on the first blockchain and that the second transaction event is already executed on the second blockchain.

In the running process of the first service contract, the first node device obtains the processing result of the first transaction event and the event information of the second transaction event returned by the first cross-chain contract. The first node device generates the first cross-chain transaction data based on the processing result of the first transaction event and the event information of the second transaction event, and stores the first cross-chain transaction data to the first blockchain.

In a possible implementation, that the first node device generates the first cross-chain transaction data based on the processing result of the first transaction event and the event information of the second transaction event includes that the first node device generates the first cross-chain transaction data based on the processing result of the first transaction event, the event information of the second transaction event, the identifier of the second service contract, and the identifier of the target program code in the second service contract.

For ease of description, a node device configured to generate a block in a node cluster is denoted as a block generation node device, and a node device for block consensus in the node cluster is denoted as a consensus node device. In a possible implementation, that the first node device stores the first cross-chain transaction data to the first blockchain includes the following operations. The first node device broadcasts the first cross-chain transaction data in the first node cluster. After receiving the first cross-chain transaction data, a block generation node device in the first node cluster packs the first cross-chain transaction data to a target block. After generating the target block, the block generation node device broadcasts the target block between consensus node devices in the first node cluster. After a consensus success of most consensus node devices in the first node cluster about the target block, each first node device in the first node cluster stores the target block to the local first blockchain, thereby implementing storage of the first cross-chain transaction data to the first blockchain.

305: A first gateway device obtains the first cross-chain transaction data on the first blockchain.

The first gateway device is a gateway device corresponding to the first blockchain.

In a possible implementation, each time at least one block is added to the first blockchain, the first gateway device queries whether the at least one block includes cross-chain transaction data. If the at least one block includes the cross-chain transaction data, the first gateway device obtains the found cross-chain transaction data. Therefore, after the first gateway device finds, from the first blockchain, the target block including the first cross-chain transaction data, the first gateway device obtains the first cross-chain transaction data from the target block.

In another possible implementation, the first gateway device monitors whether a calling event occurs on the first cross-chain contract on the first blockchain. If the calling event occurs, the first gateway device obtains cross-chain transaction data (for example, the first cross-chain transaction data) related to the calling event from the first blockchain.

It is to be noted that the first cross-chain transaction data is a piece of cross-chain transaction data involved in this embodiment of this application. Therefore, a process shown in step 305 is a process in which a gateway device in the blockchain system obtains cross-chain transaction data from a blockchain corresponding to the gateway device.

306: The first gateway device sends a first signature obtaining request for the first cross-chain transaction data to a first verification node device, the first signature obtaining request indicating a digital signature for the first cross-chain transaction data.

The first verification node device is a verification node device in the first node set, that is, a verification node device corresponding to the first blockchain. A digital signature for the first cross-chain transaction data is used for indicating that the first cross-chain transaction data is stored on the first blockchain. Alternatively, a verification node device proves that the first cross-chain transaction data is stored on the first blockchain. In some embodiments, the first signature obtaining request includes a hash value of the first cross-chain transaction data and an identifier of the target block that the first cross-chain transaction data belongs to. The block identifier of the target block is a block height of the target block on the first blockchain, and thus indicates a serial number of the target block on the blockchain.

It is to be noted that the first signature obtaining request is a signature obtaining request involved in this embodiment of this application. Therefore, a process shown in step 306 is a process in which a gateway device in the blockchain system sends a signature obtaining request to a verification node device.

307: The first verification node device receives the first signature obtaining request from the first gateway device.

308: The first verification node device signs the first cross-chain transaction data based on the first signature obtaining request to obtain the digital signature for the first cross-chain transaction data, a first digital signature indicating that the first cross-chain transaction data is stored on the first blockchain.

In a possible implementation, the first node set includes at least one first verification node device, and the at least one first verification node device serves as a verification node group in the first node set. Any first verification node device receiving the first signature obtaining request broadcasts the first signature obtaining request in the verification node group. Each first verification node device receiving the first signature obtaining request performs step 308.

In a possible implementation, a manner in which a first verification node device signs the first cross-chain transaction data based on the first signature obtaining request may include any one of the following manners A to D.

Manner A: the first verification node device endorses the first cross-chain transaction data based on the first signature obtaining request to obtain a digital signature for the first cross-chain transaction data.

The first verification node device determines the target block on the first blockchain based on the identifier of the target block in the first signature obtaining request, and queries, based on the hash value of the first cross-chain transaction data in the first signature obtaining request, whether the first cross-chain transaction data is stored in the target block. If the first cross-chain transaction data is stored in the target block, the first verification node device signs (or encrypts) the hash value of the first cross-chain transaction data by using a private key of the first verification node device to complete endorsement, so as to obtain the digital signature for the first verification node device for the first cross-chain transaction data. The digital signature is an encrypted hash value of the first cross-chain transaction data, and is a validity proof provided by the first verification node device for the first cross-chain transaction data. If the first cross-chain transaction data is not stored in the target block, the first verification node device does not sign the hash value of the first cross-chain transaction data by using a private key of the first verification node device.

In a possible implementation, that the first verification node device queries, based on the hash value of the first cross-chain transaction data in the first signature obtaining request, whether the first cross-chain transaction data is stored in the target block includes the following operations. The first verification node device obtains a Merkle root of the target block from a block header of the target block, the Merkle root of the target block being obtained based on a hash value of each piece of transaction data in the target block. The first verification node device calculates the hash value of each piece of transaction data in the target block based on the Merkle root. If the calculated hash value of a specific piece of transaction data is the same as that of the first cross-chain transaction data, the transaction data is the first cross-chain transaction data, that is, the first cross-chain transaction data is stored in the target block, and the first verification node device determines that the first cross-chain transaction data is stored on the first blockchain. If the calculated hash value of each piece of transaction data is different from that of the first cross-chain transaction data, that is, the target block does not include the first cross-chain transaction data, the first verification node device determines that the first cross-chain transaction data is not stored on the first blockchain.

In a possible implementation, the first signature obtaining request does not include the hash value of the first cross-chain transaction data, but includes the first cross-chain transaction data. In this case, the first verification node device queries the first cross-chain transaction data from the target block based on the first cross-chain transaction data in the first signature obtaining request. If finding the first cross-chain transaction data from the target block, the first verification node device determines that the first cross-chain transaction data is stored on the first blockchain; or if not finding the first cross-chain transaction data from the target block, the first verification node device determines that the first cross-chain transaction data is not stored on the first blockchain.

Manner B: the first verification node device is a light node, and block information of each block on the first blockchain is synchronized on the light node. In this case, the first verification node device obtains block information of the target block from the synchronized block information of each block on the first blockchain based on the identifier of the target block in the first signature obtaining request, and obtains a Merkle root of the target block from the block information of the target block. The first verification node device determines, based on the obtained Merkle root of the target block and the hash value of the first cross-chain transaction data in the first signature obtaining request, whether the first cross-chain transaction data is stored in the target block. If the first cross-chain transaction data is stored in the target block, the first verification node device signs the hash value of the first cross-chain transaction data to obtain a digital signature for the first cross-chain transaction data.

That the first verification node device determines, based on the obtained Merkle root of the target block and the hash value of the first cross-chain transaction data in the first signature obtaining request, whether the first cross-chain transaction data is stored in the target block refer to the related descriptions above, and will not be elaborated herein.

Manner C: the first verification node device is configured with a relay chain of the first blockchain, block information of each block on the first blockchain is stored in the relay chain, and the first verification node device may obtain a digital signature for the first cross-chain transaction data based on a block information of the target block in the relay chain with reference to a manner in Manner B.

Manner D: the first verification node device sends the first signature obtaining request to a trusted execution environment (TEE) of the first verification node device. Digital signature program code is stored in the TEE. The first verification node device runs the digital signature program code in the TEE, such that the first verification node device obtains a digital signature for the first cross-chain transaction data based on the first signature obtaining request. The digital signature program code is used for implementing any signature mechanism for signing cross-chain transaction data. The any signature mechanism may be similar to or the same as any one of Manner A to Manner C, or may be different from Manner A to Manner C.

It is to be noted that the digital signature involved in this application is a validity proof for cross-chain transaction data.

In this embodiment of this application, a manner in which the first verification node device obtains the digital signature for the first cross-chain transaction data based on the first signature obtaining request is not limited, and may be set according to a practical application scenario. A process shown in step 308 is a process in which a verification node device obtains a digital signature for a cross-chain transaction data based on a signature obtaining request.

309: The first verification node device sends the digital signature for the first cross-chain transaction data to the first gateway device.

In a possible implementation, each first verification node device in the first node cluster performs step 309. Each first verification node device generates a first signature response for the first cross-chain transaction data, and sends the first signature response to the first gateway device.

If a first verification node device signs the first cross-chain transaction data, a first signature response generated by the first verification node device includes a digital signature of the first verification node device for the first cross-chain transaction data. If the first verification node device signs the first cross-chain transaction data, the first signature response includes the hash value of the first cross-chain transaction data but no digital signature for the first cross-chain transaction data.

310: The first gateway device receives the digital signature for the first cross-chain transaction data.

In some embodiments, the first gateway device receives the first signature response from each first verification node device, and obtains the digital signature for the first cross-chain transaction data from the received first signature response.

It is to be noted that a process shown in steps 306 to 310 is an optional process. In some embodiments, the process shown in steps 306 to 310 may not be performed if the validity of the cross-chain transaction data does not need to be verified.

311: The first gateway device sends the first cross-chain transaction data and the digital signature for the first cross-chain transaction data to a second gateway device.

The second gateway device is a gateway device in a second node set, that is, a gateway device corresponding to the second blockchain.

In a possible implementation, in order to achieve compatibility with cross-chain interoperability of a plurality of different node clusters, a set of target cross-chain protocol is defined in this application, which is a general cross-chain protocol for communication between gateway devices in the blockchain system. For communication between the gateway device and the corresponding node cluster, an internal protocol of the corresponding node cluster is used. That is, data transmission is performed between gateway devices in different node sots in the blockchain system by using the target cross-chain protocol, and data transmission may be performed between devices in the same node set by using a specific transmission protocol. Transmission protocols used in different node sets may be different. For ease of description, a transmission protocol used in the first node set is denoted as a first transmission protocol for data transmission, and a transmission protocol used in the second node set is denoted as a second transmission protocol.

In a possible implementation, the first gateway device generates, based on the first cross-chain transaction data and the digital signature for the first cross-chain transaction data, a first cross-chain message that conforms to the target cross-chain protocol, and sends the first cross-chain message to the second gateway device. The first cross-chain message includes the first cross-chain transaction data and the digital signature for the first cross-chain transaction data. A data format of the first cross-chain message conforms to a cross-chain message data format specified by the target cross-chain protocol.

In a possible implementation, if the process shown in steps 306 to 310 is not performed, the first gateway device sends the first cross-chain transaction data to the second gateway device, but does not send the digital signature for the first cross-chain transaction data to the second gateway device. Accordingly, the first cross-chain message does not include the first digital signature.

312: The second gateway device receives the first cross-chain transaction data and the digital signature for the first cross-chain transaction data.

In a possible implementation, the second gateway device receives the first cross-chain message, and obtains the first cross-chain transaction data and the digital signature for the first cross-chain transaction data from the first cross-chain message.

313: The second gateway device sends the first cross-chain transaction data and the digital signature for the first cross-chain transaction data to a second node device.

The second node device is any node device in the second node set.

In a possible implementation, in order to enable the second node device to recognize the first cross-chain transaction data and the digital signature for the first cross-chain transaction data, the second gateway device generates, based on the first cross-chain transaction data and the digital signature for the first cross-chain transaction data, a second cross-chain message that conforms to the second transmission protocol. The second cross-chain message includes the first cross-chain transaction data and the digital signature for the first cross-chain transaction data. A data format of the second cross-chain message conforms to a cross-chain message data format in the second transmission protocol.

After the second cross-chain message is generated, format conversion of the first cross-chain message is completed, and the second gateway device sends the second cross-chain message to the second node device.

314: The second node device receives the first cross-chain transaction data and the digital signature for the first cross-chain transaction data.

In a possible implementation, the second node device receives the second cross-chain message, and obtains the first cross-chain transaction data and the digital signature for the first cross-chain transaction data from the second cross-chain message.

A process shown in steps 312 to 314 is a process in which the second node device obtains the first cross-chain transaction data from the first blockchain.

315: The second node device runs a second cross-chain contract on the second blockchain based on the first cross-chain transaction data, the second cross-chain contract being used for indicating a fourth execution manner for the cross-chain service on the second blockchain.

The second cross-chain contract is a cross-chain contract on the second blockchain. For the second node device, the first blockchain is a peer chain, and the second blockchain is a current chain. For the first node device, the first blockchain is a current chain, and the second blockchain is a peer chain. The fourth execution manner is implemented by a processing logic, related to a cross-chain transaction initiated on the peer chain, in the second cross-chain contract. The fourth execution manner includes verifying the validity of the first cross-chain transaction data on the first blockchain, storing the first cross-chain transaction data to the second blockchain, calling the second service contract to execute, on the second blockchain, the second transaction event, and storing second cross-chain transaction data to the second blockchain. It is optional to verify the validity of the first cross-chain transaction data on the first blockchain.

After the first cross-chain transaction data (or the first cross-chain transaction data and the digital signature for the first cross-chain transaction data) is received, the second node device is triggered to obtain the second cross-chain contract from the local second blockchain, so as to call the first cross-chain contract. The second node device inputs the first cross-chain transaction data (or the first cross-chain transaction data and the digital signature for the first cross-chain transaction data) to the second cross-chain contract as an input parameter of the second cross-chain contract, and runs the second cross-chain contract.

316: The second node device stores the first cross-chain transaction data to the second blockchain through the second cross-chain contract, and runs the second service contract, the second service contract indicating a third execution manner for the cross-chain service on the second blockchain.

The second service contract is a service contract on the second blockchain. The third execution manner is implemented by the processing logic, related to the cross-chain transaction initiated on the peer chain, in the second cross-chain contract. The third execution manner includes receiving calling for the second cross-chain contract, and executing the second transaction event on the second blockchain. In a running process of the second cross-chain contract, the second node device stores the first cross-chain transaction data to the second blockchain, so as to trigger calling for the second service contract on the second blockchain. When calling for the second service contract on the second blockchain is triggered, the second node device obtains the second service contract from the local second blockchain, and inputs the event information of the second transaction event (or the event information and the identifier of the target program code) in the first cross-chain transaction data to the second service contract as an input parameter of the second service contract. The second node device runs the second service contract.

In a possible implementation, that the second node device stores the first cross-chain transaction data to the second blockchain includes that: the second node device verifies the first cross-chain transaction data based on the digital signature for the first cross-chain transaction data, and if the first cross-chain transaction data passes verification, the second node device stores the first cross-chain transaction data to the second blockchain or if the first cross-chain transaction data does not pass verification, the second node device does not perform a subsequent step.

That the second node device verifies the first cross-chain transaction data based on the digital signature for the first cross-chain transaction data includes that:

if a quantity of digital signatures for the first cross-chain transaction data is greater than a second threshold, the first cross-chain transaction data passes verification, or if a quantity of digital signatures for the first cross-chain transaction data is not greater than a second threshold, the first cross-chain transaction data does not pass verification of the second node device, the second threshold being a half of a total quantity of verification node devices in the first node cluster.

Alternatively, the second node device verifies a data format of the first cross-chain transaction data, and if the data format of the first cross-chain transaction data passes verification and a quantity of digital signatures for the first cross-chain transaction data is greater than a second threshold, the first cross-chain transaction data passes verification of the second node device, or if the data format of the first cross-chain transaction data passes verification and a quantity of digital signatures for the first cross-chain transaction data is greater than a second threshold, the first cross-chain transaction data does not pass verification.

That the second node device verifies a data format of the first cross-chain transaction data includes that: the second node device detects whether the data format of the first cross-chain transaction data conforms to a preset first data format, and if the data format of the first cross-chain transaction data conforms to the preset first data format, the data format of the first cross-chain transaction data passes verification, or if the data format of the first cross-chain transaction data does not conform to the preset first data format, the data format of the first cross-chain transaction data does not pass verification.

317: The second node device executes, on the second blockchain through the second service contract, the second transaction event, continues to run the second cross-chain contract, and stores the second cross-chain transaction data to the second blockchain, the second cross-chain transaction data indicating that the second transaction event is already executed on the second blockchain.

In a running process of the second service contract, the second node device inputs the event information of the second transaction event to the target program code of the service contract as an input parameter of the target program code based on the identifier of the target program code in the first cross-chain transaction data, and runs the target program code.

In a running process of the target program code, the second node device executes the second transaction event on the second blockchain, and returns a processing result of the second transaction event to the second cross-chain contract. If the second transaction event is successfully executed, the processing result of the second transaction event is a first processing result, or if the second transaction event fails to be executed, the processing result of the second transaction event is a second processing result.

The first node device is triggered based on the processing result of the second transaction event returned by the second service contract to continue to execute the second cross-chain contract. When the second cross-chain contract continues to be executed, the second node device generates the second cross-chain transaction data based on the processing result of the second transaction event, and stores the second cross-chain transaction data to the second blockchain.

A process in which the second node device stores the second cross-chain transaction data to the second blockchain is similar to a process in step 303 in which the first node device stores the first cross-chain transaction data to the first blockchain. Herein, the process in which the second node device stores the second cross-chain transaction data to the second blockchain is not elaborated in this embodiment of this application.

318: The second gateway device obtains the second cross-chain transaction data on the second blockchain.

Step 318 is similar to step 305. Herein, step 318 is not elaborated in this embodiment of this application.

319: The second gateway device sends a second signature obtaining request for the second cross-chain transaction data to a second verification node device, the second signature obtaining request indicating a digital signature for the second cross-chain transaction data.

Step 319 is similar to step 306. Herein, step 319 is not elaborated in this embodiment of this application.

The second verification node device is a verification node device in the second node set, that is, a verification node device corresponding to the second blockchain. A digital signature for the second cross-chain transaction data indicates that the second cross-chain transaction data is stored on the second blockchain.

320: The second verification node device receives the second signature obtaining request from the second gateway device.

Step 320 is similar to step 307. Herein, step 320 is not elaborated in this embodiment of this application.

321: The second verification node device obtains the digital signature for the second cross-chain transaction data based on the second signature obtaining request.

Step 321 is similar to step 308, Herein, step 321 is not elaborated in this embodiment of this application.

322: The second verification node device sends the digital signature for the second cross-chain transaction data to the second gateway device.

Step 322 is similar to step 309. Herein, step 322 is not elaborated in this embodiment of this application.

323: The second gateway device receives the digital signature for the second cross-chain transaction data.

Step 323 is similar to step 310. Herein, step 323 is not elaborated in this embodiment of this application.

It is to be noted that a process shown in steps 319 to 323 is an optional process. In some embodiments, the process shown in steps 319 to 323 may not be performed if the validity of the cross-chain transaction data does not need to be verified.

324: The second gateway device sends the second cross-chain transaction data and the digital signature for the second cross-chain transaction data to the first gateway device.

In a possible implementation, the second gateway device generates, based on the second cross-chain transaction data and the digital signature for the second cross-chain transaction data, a third cross-chain message that conforms to the target cross-chain protocol, and sends the third cross-chain message to the first gateway device. The third cross-chain message includes the second cross-chain transaction data and the digital signature for the second cross-chain transaction data. A data format of the third cross-chain message conforms to the cross-chain message data format specified by the target cross-chain protocol.

In a possible implementation, if the process shown in steps 319 to 323 is not performed, the second gateway device sends the second cross-chain transaction data to the first gateway device, but does not send the digital signature for the second cross-chain transaction data to the first gateway device. Accordingly, the third cross-chain message does not include the digital signature for the second cross-chain transaction data.

325: The first gateway device receives the second cross-chain transaction data and the digital signature for the second cross-chain transaction data.

Step 325 is similar to step 312. Herein, step 325 is not elaborated in this embodiment of this application.

326: The first gateway device sends the second cross-chain transaction data and the digital signature for the second cross-chain transaction data to the first node device.

In a possible implementation, in order to enable the first node device to recognize the second cross-chain transaction data and the digital signature for the second cross-chain transaction data, the first gateway device generates, based on the second cross-chain transaction data and the digital signature for the second cross-chain transaction data, a fourth cross-chain message that conforms to the first transmission protocol. The fourth cross-chain message includes the second cross-chain transaction data and the digital signature for the second cross-chain transaction data. A data format of the fourth cross-chain message conforms to a cross-chain message data format in the first transmission protocol.

After the fourth cross-chain message is generated, format conversion of the third cross-chain message is completed, and the first gateway device sends the fourth cross-chain message to the first node device.

327: The first node device receives the second cross-chain transaction data and the digital signature for the second cross-chain transaction data.

Step 327 is similar to step 314. Herein, step 327 is not elaborated in this embodiment of this application.

A process shown in steps 324 to 327 is a process in which the first node device receives, from the first gateway device, the second cross-chain transaction data that is provided by the second gateway device and that is on the second blockchain.

328: The first node device sends a transaction completion response to the terminal through the first service contract and the first cross-chain contract, the transaction completion response indicating that the cross-chain transaction is already completed.

After the first node device obtains the second cross-chain transaction data, if the processing result in the second cross-chain transaction data is the first processing result, it indicates that the second transaction event is successfully executed on the second blockchain. If the processing result in the first cross-chain transaction data is the first processing result, it indicates that the first transaction event is successfully executed on the first blockchain. If both the first transaction event and the second transaction event are successfully executed, the first node device returns the transaction completion response to the terminal. If the processing result of the second transaction event in the second cross-chain transaction data is the second result, or the processing result of the first transaction event in the first cross-chain transaction data is the second processing result, the first node device returns a transaction failure response to the terminal, the transaction failure response being used for indicating that the cross-chain transaction fails to be processed.

In a possible implementation, the first node device may call the first service contract by running the first cross-chain contract on the first block, to send the transaction completion response or the transaction failure response to the terminal, for example, through the following steps 3281 and 3282.

Step 3281: The first node device runs the first cross-chain contract again based on the second cross-chain transaction data.

After the second cross-chain transaction data (or the second cross-chain transaction data and the digital signature for the second cross-chain transaction data) is received, the first node device is triggered to input the second cross-chain transaction data (or the second cross-chain transaction data and the digital signature for the second cross-chain transaction data) to the first cross-chain contract as the input parameter of the first cross-chain contract, and run the first cross-chain contract again.

Step 3282: The first node device sends the second cross-chain transaction data to the first service contract through the first cross-chain contract that is run again, and runs the first service contract again to send the transaction completion response to the terminal.

In a process of running the first cross-chain contract again, the first node device stores the second cross-chain transaction data to the first blockchain, so as to trigger calling for the first service contract on the first blockchain. When triggering calling for the first service contract on the first blockchain, the first node device inputs the second cross-chain transaction data (or the second cross-chain transaction data and the digital signature for the second cross-chain transaction data) to the first service contract as the input parameter of the first service contract, and runs the first service contract again. In a process of running the second service contract again, the first node device determines, based on the first cross-chain transaction data and the second cross-chain transaction data, whether the cross-chain transaction is already completed, and sends the transaction completion response to the terminal if the cross-chain transaction is already completed, or sends the transaction failure response to the terminal if the cross-chain transaction is yet not completed.

In a possible implementation, that the first node device stores the second cross-chain transaction data to the first blockchain includes that: the first node device verifies the second cross-chain transaction data based on the digital signature for the second cross-chain transaction data, and if the second cross-chain transaction data passes verification, the first node device stores the second cross-chain transaction data to the first blockchain, or if the second cross-chain transaction data does not pass verification, the first node device does not store the second cross-chain transaction data to the first blockchain.

That the first node device verifies the second cross-chain transaction data based on the digital signature for the second cross-chain transaction data includes that:

if a quantity of digital signatures for the second cross-chain transaction data is greater than a first threshold, the second cross-chain transaction data passes verification of the first node device, or if a quantity of digital signatures for the second cross-chain transaction data is not greater than a first threshold, the second cross-chain transaction data does not pass verification, the first threshold being a half of a total quantity of verification node devices in the second node cluster.

Alternatively, the first node device verifies a data format of the second cross-chain transaction data, and if the data format of the second cross-chain transaction data passes verification and a quantity of digital signatures for the second cross-chain transaction data is greater than a first threshold, the second cross-chain transaction data passes verification of the first node device, or if the data format of the second cross-chain transaction data passes verification and a quantity of digital signatures for the second cross-chain transaction data is greater than a first threshold, the second cross-chain transaction data does not pass verification.

That the first node device verifies a data format of the second cross-chain transaction data includes that: the first node device detects whether the data format of the second cross-chain transaction data conforms to a preset second data format, and if the data format of the second cross-chain transaction data conforms to the preset second data format, the data format of the second cross-chain transaction data passes verification of the first node device, or if the data format of the second cross-chain transaction data does not conform to the preset second data format, the data format of the second cross-chain transaction data does not pass verification of the first node device.

According to the method provided in this embodiment of this application, the node device in the blockchain system runs the service contracts and the cross-chain contracts on the blockchains to perform the cross-chain transaction when receiving the cross-chain transaction request of the terminal, and returns the transaction completion response to the terminal after the cross-chain transaction is completed. In a processing process of the cross-chain transaction, the terminal requests to perform the cross-chain transaction and receives the processing result of the cross-chain transaction, without caring about a specific processing process of the cross-chain transaction. Therefore, a service burden of the terminal is reduced. In addition, storing the cross-chain contracts to the blockchains can enable each node device in the blockchain system to complete the cross-chain transaction, and avoid the cross-chain transaction data being tampered. Moreover, the verification node device is used as an independent device configured to prove the validity of the cross-chain transaction data, so that a user can customize a rule for proving validity of cross-chain transaction data in the verification node device, and the gateway device does not need to prove the validity of the cross-chain transaction data. This reduces a service burden of the gateway device. An execution process of the cross-chain transaction is dispersed in a plurality of devices (the node devices, the gateway devices, and the verification node devices), so as to complete the cross-chain transaction with a distributed cross-chain framework. This cross-chain framework is abstracted as a general service, which may use a plurality of different implementation manners internally and externally provides a unified digital signature for verification. This cross-chain framework is highly customizable and extensible, and can meet cross-chain requirements of different scenarios.

Figure 4:
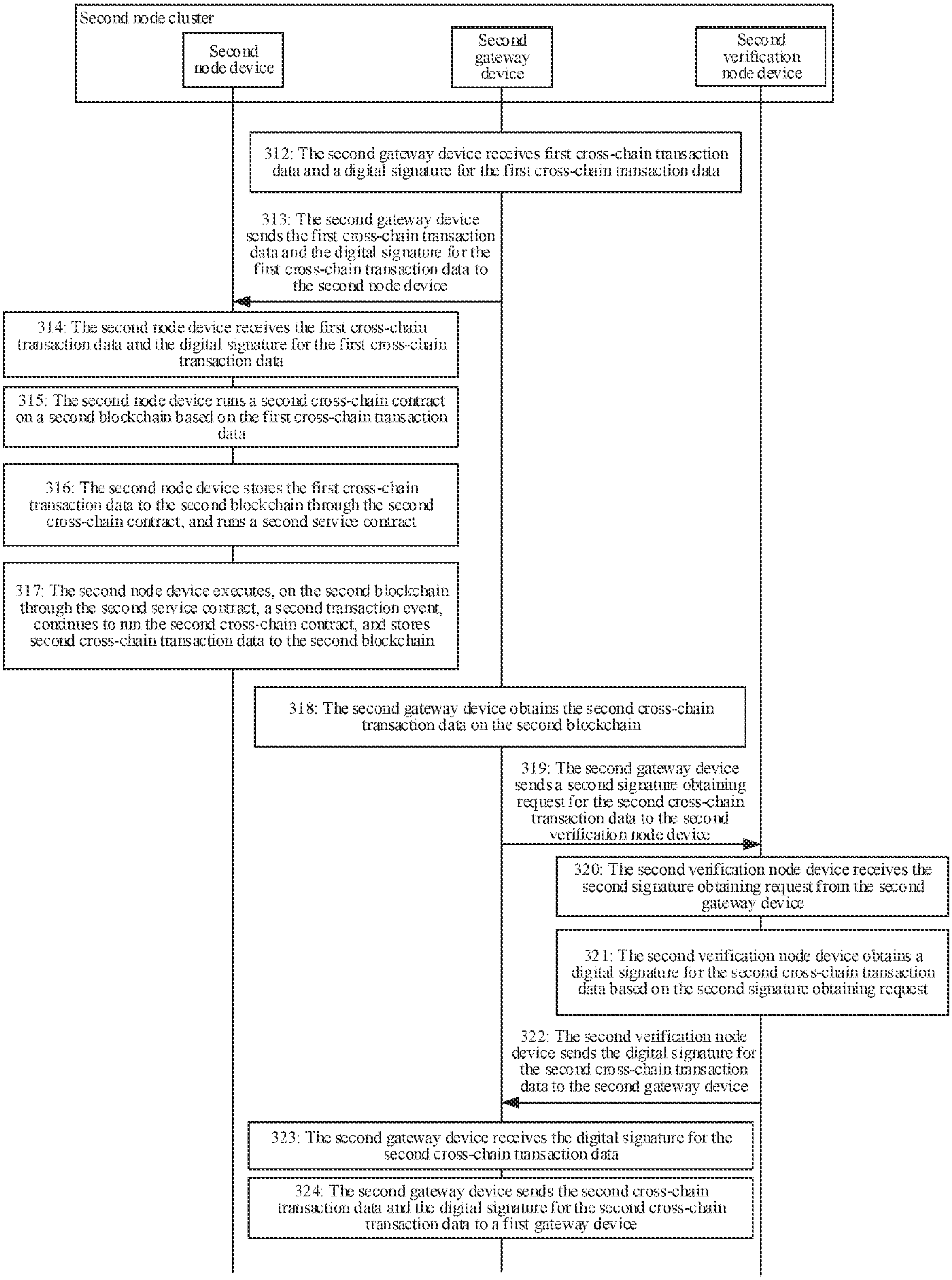
FIG. 4 is a flowchart of processing a cross-chain transaction by a second node set according to an embodiment of this application.

In addition, the following three points need to be described with respect to FIG. 3 and FIG. 4.

First, an execution logic of a step performed by the node device through a service contract is implemented by program code (or a computer program) in the service contract, and an execution logic of a step performed by the node device through a cross-chain contract is implemented by program code (or a computer program) the cross-chain contract.

Second, since many steps are involved, steps 301 to 328 are split into FIG. 3 and FIG. 4 for a clear logic. FIG. 3 is a flowchart of processing the cross-chain transaction by the first node set according to an embodiment of this application. FIG. 3 includes steps performed by each device in the first node set to process the cross-chain transaction. FIG. 4 is a flowchart of processing the cross-chain transaction by the second node set according to an embodiment of this application. FIG. 4 includes steps performed by each device in the second node set to process the cross-chain transaction.

Third, in the processes shown in FIG. 3 and FIG. 4, each node set includes a verification node device, and a digital signature for cross-chain transaction data stored on the blockchain of each node set is provided by the verification node device in the corresponding node set. In another possible implementation, the node sets in the blockchain system may share a same verification node device, and the same verification node device provides a digital signature for cross-chain transaction data in each node set in the blockchain system.

Figure 5:
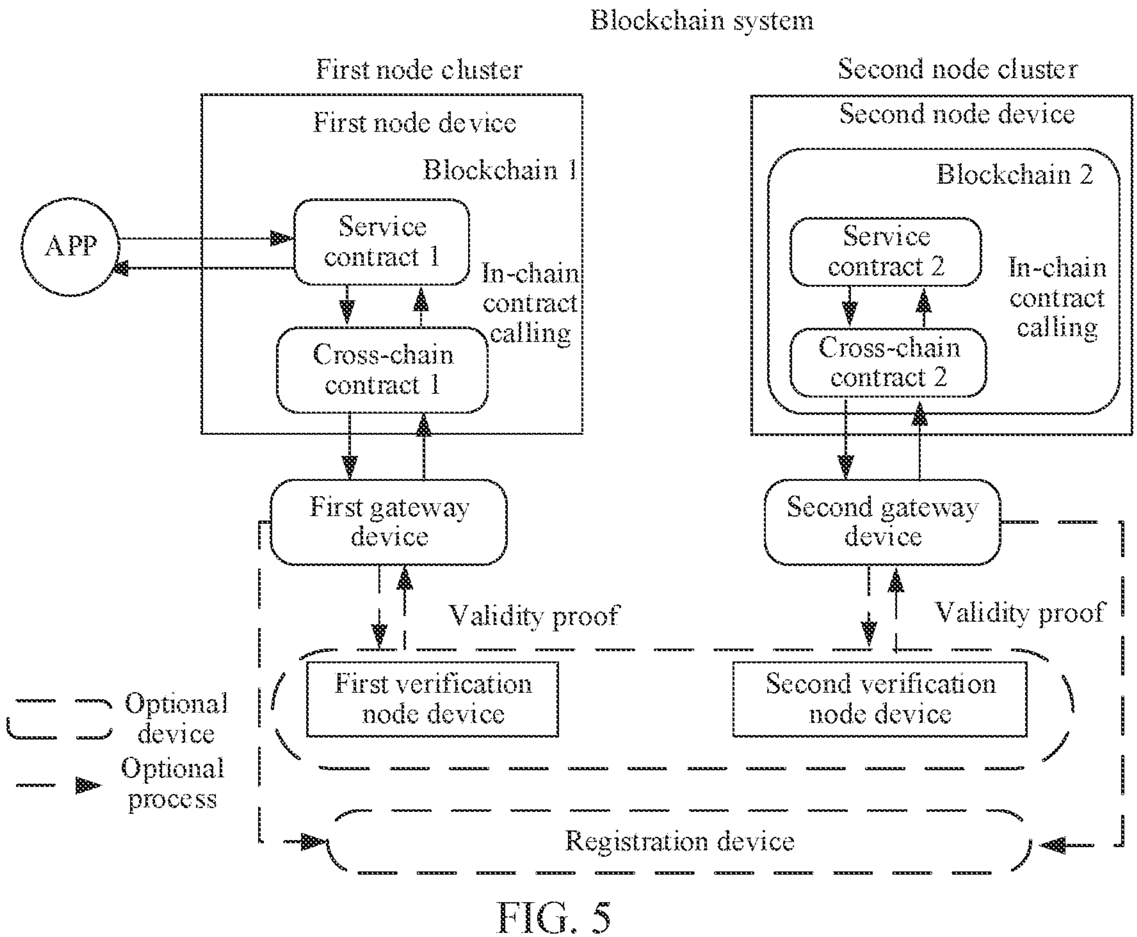
FIG. 5 is a schematic diagram of a cross-chain transaction processing method according to an embodiment of this application.

In order to further describe the processes shown in FIG. 3 and FIG. 4, the following describes the processing process of the cross-chain transaction by using a blockchain system shown in FIG. 5 as an example.

FIG. 5 is a schematic diagram of a cross-chain transaction processing method according to an embodiment of this application. The blockchain system in FIG. 5 includes a first node cluster, a second node cluster, and a registration device. A node device in the first node cluster is a first node device. A plurality of first node devices maintain a blockchain 1. A node device in the second node cluster is a second node device. A plurality of second node devices maintain a blockchain 2. A gateway device in the first node cluster is a first gateway device. A gateway device in the second node cluster is a second gateway device. A verification node device in the first node cluster is a first verification node device. A verification node device in the second node cluster is a second verification node device. The first node device may receive a cross-chain transaction request of a terminal. The cross-chain transaction request may be a sent by a service application (APP) in the terminal (as shown in FIG. 5). The service APP may be a cross-chain APP or a decentralized APP (DAPP).

After receiving the cross-chain transaction request, the first node device may run a service contract 1 on the blockchain 1. The service contract 1 executes, on the current chain (that is, the blockchain 1), a first transaction event of the cross-chain transaction, and calls a cross-chain contract 1 on the blockchain 1 to determine to execute, on a peer chain (that is, the blockchain 2), a second transaction event of the cross-chain transaction. If the transaction event of the cross-chain transaction is completed on the current chain, and the second transaction event to be executed on the peer chain is determined, the service contract 1 stores cross-chain transaction data 1 of the cross-chain transaction on the current chain to the current chain. The first gateway device may obtain a validity proof (that is, a digital signature) for the cross-chain transaction data 1 from the first verification node device, and send the validity proof and the cross-chain transaction data 1 to the second gateway device. The second gateway device sends the received cross-chain transaction data 1 and validity proof to the second node device. The second node device runs a cross-chain contract 2 on the current chain (that is, the blockchain 2) based on the cross-chain transaction data 1. If the validity proof passes verification of the cross-chain contract 2, the cross-chain contract 2 stores the cross-chain transaction data 1 to the current chain, and calls a service contract 2 on the current chain. The service contract 2 executes, on the blockchain 2, the second transaction event of the cross-chain transaction, and returns a processing result of the second transaction event to the cross-chain contract 2. The cross-chain contract 2 stores cross-chain transaction data 2 to the blockchain 2 based on the processing result of the second transaction event. The second gateway device obtains the cross-chain transaction data 2 from the blockchain 2, obtains a validity proof (that is, a digital signature) for the cross-chain transaction data 2 from the second verification node device, and returns the cross-chain transaction data 2 and the validity proof to the first gateway device. The first gateway device then returns the cross-chain transaction data 2 and the validity proof to the first node device. The first node device runs the cross-chain contract 1 again. If the received validity proof passes verification of the cross-chain contract 1, the cross-chain contract 1 calls the service contract 1 to send a transaction completion response to the terminal or the service APP in the terminal.

Figure 6:
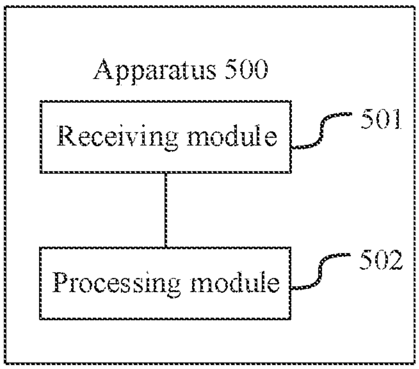
FIG. 6 is a schematic structural diagram of a cross-chain transaction processing apparatus according to an embodiment of this application.

FIG. 6 is a schematic structural diagram of a cross-chain transaction processing apparatus according to an embodiment of this application. Referring to FIG. 6, the apparatus 500 is configured in a blockchain system. A first blockchain and a second blockchain are further configured in the blockchain system. The apparatus 500 includes:

a receiving module 501, configured to receive a cross-chain transaction request of a terminal, the cross-chain transaction request instructing a cross-chain transaction to be performed between the first blockchain and the second blockchain; and a processing module 502, configured to run a first service contract on the first blockchain based on the cross-chain transaction request, the first service contract indicating a first execution manner for the cross-chain transaction on the first blockchain, execute, on the first blockchain through the first service contract, a first transaction event of the cross-chain transaction, run a first cross-chain contract on the first blockchain, determine to execute, on the second blockchain, a second transaction event of the cross-chain transaction, the first cross-chain contract indicating a second execution manner for the cross-chain transaction on the first blockchain, and store first cross-chain transaction data to the first blockchain through the first service contract, the first cross-chain transaction data indicating that the first transaction event is already executed on the first blockchain and that the second transaction event is already executed on the second blockchain.

The receiving module 501 is further configured to obtain second cross-chain transaction data from the second blockchain, the second cross-chain transaction data being obtained based on the first cross-chain transaction data, and the second cross-chain transaction data indicating that the second transaction event is already executed on the second blockchain.

The processing module 502 is further configured to send a transaction completion response to the terminal through the first service contract and the first cross-chain contract, the transaction completion response indicating that the cross-chain transaction is already completed.

In some embodiments, the processing module 502 is further configured to:

run the first cross-chain contract again based on the second cross-chain transaction data; and send the second cross-chain transaction data to the first service contract through the first cross-chain contract that is run again, and run the first service contract again to send the transaction completion response to the terminal.

In some embodiments, the receiving module 501 is further configured to receive a digital signature for the second cross-chain transaction data, the digital signature indicating that the second cross-chain transaction data is already stored to the second blockchain.

Sending the second cross-chain transaction data to the first service contract includes:

sending the second cross-chain transaction data to the first service contract when a quantity of digital signatures for the second cross-chain transaction data is greater than a first threshold.

In some embodiments, the receiving module 501 is further configured to:

receive, when the first blockchain corresponds to a first gateway device and the second blockchain corresponds to a second gateway device, the second cross-chain transaction data on the second blockchain from the first gateway device, the second cross-chain transaction data being provided by the second gateway device.

In some embodiments, the cross-chain transaction request includes transaction information of the cross-chain transaction, an identifier of the first service contract, and an identifier of a second service contract on the second blockchain, and the second service contract indicates a third execution manner for the cross-chain transaction on the second blockchain.

It is to be noted that when the cross-chain transaction processing apparatus 500 processes a cross-chain transaction, division of the functional modules is used merely as an example for description. In actual applications, depending on a requirement, the functions may be allocated to different functional modules for implementation, that is; an internal structure of the apparatus is divided into different functional modules to implement all or some of the functions described above. In addition, the cross-chain transaction processing apparatus provided in the foregoing embodiment pertain to a same concept as the cross-chain transaction processing method embodiment, and a specific implementation process thereof refers to the method embodiment, and will not be elaborated herein.

Figure 7:
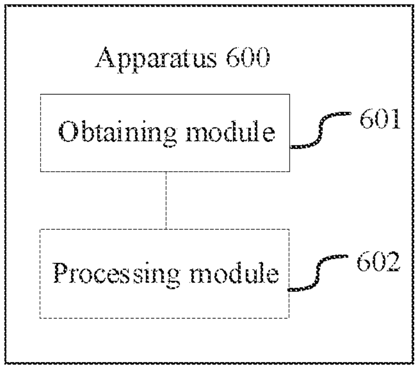
FIG. 7 is a schematic structural diagram of a cross-chain transaction processing apparatus according to an embodiment of this application.

FIG. 7 is a schematic structural diagram of a cross-chain transaction processing apparatus according to an embodiment of this application. The apparatus 600 is configured in a blockchain system. A first blockchain and a second blockchain are further configured in the blockchain system. The apparatus 600 includes:

an obtaining module 601, configured to obtain first cross-chain transaction data from the first blockchain, the first cross-chain transaction data indicating that a first transaction event of a cross-chain transaction is already executed on the first blockchain and that a second transaction event of the cross-chain transaction is already executed on the second blockchain; and a processing module 602, configured to run a second cross-chain contract on the second blockchain based on the first cross-chain transaction data, the second cross-chain contract indicating a fourth execution manner for the cross-chain transaction on the second blockchain, store the first cross-chain transaction data to the second blockchain through the second cross-chain contract, run a second service contract on the second blockchain, the second service contract indicating a third execution manner for the cross-chain transaction on the second blockchain, execute, on the second blockchain through the second service contract, the second transaction event, continue to run the second cross-chain contract, and store second cross-chain transaction data to the second blockchain, the second cross-chain transaction data indicating that the second transaction event is already executed on the second blockchain.

In some embodiments, the obtaining module 601 is further configured to receive a digital signature for the first cross-chain transaction data, the digital signature indicating that the first cross-chain transaction data is already stored to the first blockchain.

Storing the first cross-chain transaction data to the second blockchain includes:

storing the first cross-chain transaction data to the second blockchain when a quantity of digital signatures for the first cross-chain transaction data is greater than a second threshold.

In some embodiments, the obtaining module 601 is configured to:

receive, when the first blockchain corresponds to a first gateway device and the second blockchain corresponds to a second gateway device, the first cross-chain transaction data on the first blockchain from the second gateway device, the first cross-chain transaction data being provided by the first gateway device.

It is to be noted that when the cross-chain transaction processing apparatus 600 processes a cross-chain transaction, division of the functional modules is used merely as an example for description. In actual applications, depending on a requirement, the functions may be allocated to different functional modules for implementation, that is, an internal structure of the apparatus is divided into different functional modules to implement all or some of the functions described above. In addition, the cross-chain transaction processing apparatus provided in the foregoing embodiment pertain to a same concept as the cross-chain transaction processing method embodiment, and a specific implementation process thereof refers to the method embodiment, and will not be elaborated herein.

Figure 8:
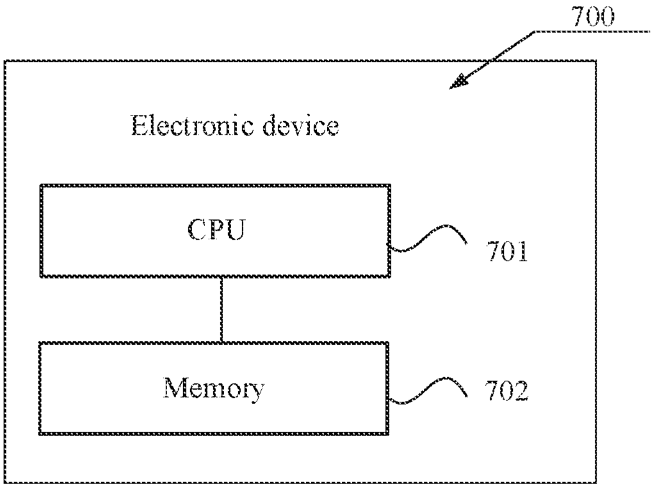
FIG. 8 is a schematic structural diagram of an electronic device according to an embodiment of this application.

FIG. 8 is a schematic structural diagram of an electronic device according to an embodiment of this application. Referring to FIG. 8, the electronic device 700 may be configured as any device in the blockchain system described above, for example, any node device, any gateway device, any verification node device, or the registration device. The electronic device 700 may differ greatly because of different configurations or performance, and may include one or more than one central processing unit (CPU) 701 and one or more than one memory 702. The memory 702 stores at least one piece of computer program. The at least one piece of computer program is loaded and executed by the CPU 701 to implement the method provided in each method embodiment. Certainly, the electronic device 700 may be further provided with a wired or wireless network interface, a keyboard, an input/output interface, or another component, to facilitate inputting and outputting. The electronic device 700 may further include another component for realizing a device function. Elaborations are omitted herein.

In an exemplary embodiment, a non-transitory computer-readable storage medium is also provided, for example, a memory including program code. The program code may be executed by a processor in a terminal to perform the cross-chain transaction processing method in the following embodiments. For example, the computer-readable storage medium may be a read-only memory (ROM), a random-access memory (RAM), a compact disc read-only memory (CD-ROM), a magnetic tape, a floppy disk, an optical data storage device, or the like.

All the foregoing optional technical solutions may be randomly combined to form optional embodiments of the present disclosure. Details are not described herein.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. It may be understood by a person of ordinary skill in the art that all or some of the steps in the foregoing embodiments may be completed by hardware, or by a program instructing related hardware. The program may be stored in a computer-readable storage medium. The storage medium may be a ROM, a magnetic disk, an optical disk, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A cross-chain transaction processing method, performed by a blockchain system including a first node cluster, a second node cluster and a registration device, wherein the first node cluster includes a first plurality of node devices, a first gateway device, and a first verification node device, and the second node cluster includes a second plurality of node devices, a second gateway device, and a second verification node device, the first plurality of node devices in the first node cluster maintaining a first blockchain and the second plurality of node devices in the second node cluster maintaining a second blockchain, the method comprising:

receiving, at a first node device in the first node cluster, a cross-chain transaction request of a terminal, the cross-chain transaction request including transaction information of a cross-chain transaction, an identifier of a first service contract on the first blockchain, and an identifier of a second service contract on the second blockchain, and the transaction information including positions of to-be-modified data on the first blockchain and the second blockchain and modified data of the to-be-modified data on the first blockchain and the second blockchain;

running, at the first node device, a first service contract on the first blockchain based on the cross-chain transaction request, wherein the first service contract indicates a first execution manner for the cross-chain transaction on the first blockchain, further including:

obtaining the first service contract from the first blockchain based on the identifier of the first service contract on the first blockchain;

inputting the cross-chain transaction request to the first service contract as an input parameter;

executing, through the first service contract, a first transaction event of the cross-chain transaction to obtain first cross-chain transaction data, the first cross-chain transaction data including the identifier of the second service contract on the second blockchain;

calling a first cross-chain contract on the first blockchain to determine a second transaction event of the cross-chain transaction to be performed at the second blockchain, wherein the first cross-chain contract indicates a second execution manner for the cross-chain transaction on the second blockchain; and storing the first cross-chain transaction data to the first blockchain through the first service contract, the first cross-chain transaction data indicating that the first transaction event is already executed on the first blockchain;

receiving, at the first gateway device, the first cross-chain transaction data from the first blockchain and a digital signature of the first cross-chain transaction data from the first verification node device, respectively;

sending, at the first gateway device, the first cross-chain transaction data and the digital signature of the first cross-chain transaction data to the second gateway device;

receiving, at the second node device, the first cross-chain transaction data and the digital signature of the first cross-chain transaction data from the second gateway device;

running, at the second node device, a second cross-chain contract on the second blockchain in the second execution manner corresponding to the second transaction event of the cross-chain transaction in accordance with the first cross-chain transaction data and the digital signature of the first cross-chain transaction data, further including:

obtaining the second service contract from the second blockchain based on the identifier of the second service contract on the second blockchain;

verifying validity of the first cross-chain transaction data of the cross-chain transaction on the second blockchain based on the digital signature of the first cross-chain transaction data;

executing the second cross-chain contract of the second blockchain based on the first cross-chain transaction data;

executing, through the second service contract, the second transaction event of the cross-chain transaction based on the first cross-chain transaction data to obtain second cross-chain transaction data;

storing second cross-chain transaction data corresponding to the second transaction event of the cross-chain transaction to the second blockchain, the second cross-chain transaction data indicating that the second transaction event is already executed on the second blockchain;

obtaining, at the second gateway device, the second cross-chain transaction data from the second blockchain;

receiving, at the second gateway device, the second cross-chain transaction data from the second blockchain and a digital signature of the second cross-chain transaction data from the second verification node device, respectively;

sending, at the second gateway device, the second cross-chain transaction data and the digital signature of the second cross-chain transaction data to the first gateway device;

obtaining, by the first node device, the second cross-chain transaction data from the second blockchain based on the first cross-chain transaction data through the first gateway device; and sending, by the first node device, a transaction completion response to the terminal through the first service contract and the first cross-chain contract, the transaction completion response indicating that the cross-chain transaction is already completed.

2. The method according to claim 1, wherein the sending, by the first node device, a transaction completion response to the terminal through the first service contract and the first cross-chain contract comprises:

running the first cross-chain contract again based on the second cross-chain transaction data;

sending the second cross-chain transaction data to the first service contract through the first cross-chain contract that is run again; and running the first service contract again to send the transaction completion response to the terminal.

3. The method according to claim 2, wherein the method further comprises:

before running the first cross-chain contract again based on the second cross-chain transaction data, receiving a digital signature for the second cross-chain transaction data, the digital signature indicating that the second cross-chain transaction data is already stored to the second blockchain; and sending the second cross-chain transaction data to the first service contract when a quantity of digital signatures for the second cross-chain transaction data is greater than a first threshold.

4. A blockchain system implemented on a computer network system, the blockchain system including a first node cluster, a second node cluster and a registration device, wherein the first node cluster includes a first plurality of node devices, a first gateway device, and a first verification node device, and the second node cluster includes a second plurality of node devices, a second gateway device, and a second verification node device, the first plurality of node devices in the first node cluster maintaining a first blockchain and the second plurality of node devices in the second node cluster maintaining a second blockchain configured to implement a cross-chain transaction processing method including:

receiving, at a first node device in the first node cluster, a cross-chain transaction request of a terminal, the cross-chain transaction request instructing a cross-chain transaction to be performed between the first blockchain and the second blockchain;

running, at the first node device, a first service contract on the first blockchain based on the cross-chain transaction request, wherein the first service contract indicates a first execution manner for the cross-chain transaction on the first blockchain;

executing, at the first node device and through the first service contract, a first transaction event of the cross-chain transaction to obtain first cross-chain transaction data;

running, at the first node device, a first cross-chain contract on the first blockchain in the first execution manner to determine a second transaction event of the cross-chain transaction to be performed at the second blockchain, wherein the first cross-chain contract indicates a second execution manner for the cross-chain transaction on the second blockchain;

storing, at the first node device, the first cross-chain transaction data to the first blockchain through the first service contract, the first cross-chain transaction data indicating that the first transaction event is already executed on the first blockchain;

receiving, at the first gateway device, the first cross-chain transaction data from the first blockchain and a digital signature of the first cross-chain transaction data from the first verification node device, respectively;

sending, at the first gateway device, the first cross-chain transaction data and the digital signature of the first cross-chain transaction data to the second gateway device;

receiving, at the second node device, the first cross-chain transaction data and the digital signature of the first cross-chain transaction data from the second gateway device;

running, at the second node device, a second cross-chain contract on the second blockchain in the second execution manner corresponding to the second transaction event of the cross-chain transaction in accordance with the first cross-chain transaction data and the digital signature of the first cross-chain transaction data;

receiving, at a first node device in the first node cluster, a cross-chain transaction request of a terminal, the cross-chain transaction request including transaction information of a cross-chain transaction, an identifier of a first service contract on the first blockchain, and an identifier of a second service contract on the second blockchain, and the transaction information including positions of to-be-modified data on the first blockchain and the second blockchain and modified data of the to-be-modified data on the first blockchain and the second blockchain;

running, at the first node device, a first service contract on the first blockchain based on the cross-chain transaction request, wherein the first service contract indicates a first execution manner for the cross-chain transaction on the first blockchain, further including:

obtaining the first service contract from the first blockchain based on the identifier of the first service contract on the first blockchain;

inputting the cross-chain transaction request to the first service contract as an input parameter;

executing, through the first service contract, a first transaction event of the cross-chain transaction to obtain first cross-chain transaction data, the first cross-chain transaction data including the identifier of the second service contract on the second blockchain;

calling a first cross-chain contract on the first blockchain in the first execution manner to determine a second transaction event of the cross-chain transaction to be performed at the second blockchain, wherein the first cross-chain contract indicates a second execution manner for the cross-chain transaction on the second blockchain; and storing the first cross-chain transaction data to the first blockchain through the first service contract, the first cross-chain transaction data indicating that the first transaction event is already executed on the first blockchain;

receiving, at the first gateway device, the first cross-chain transaction data from the first blockchain and a digital signature of the first cross-chain transaction data from the first verification node device, respectively;

sending, at the first gateway device, the first cross-chain transaction data and the digital signature of the first cross-chain transaction data to the second gateway device;

receiving, at the second node device, the first cross-chain transaction data and the digital signature of the first cross-chain transaction data from the second gateway device;

running, at the second node device, a second cross-chain contract on the second blockchain in the second execution manner corresponding to the second transaction event of the cross-chain transaction in accordance with the first cross-chain transaction data and the digital signature of the first cross-chain transaction data, further including:

obtaining the second service contract from the second blockchain based on the identifier of the second service contract on the second blockchain;

verifying validity of the first cross-chain transaction data of the cross-chain transaction on the second blockchain based on the digital signature of the first cross-chain transaction data;

executing the second cross-chain contract of the second blockchain based on the first cross-chain transaction data;

executing, through the second service contract, the second transaction event of the cross-chain transaction based on the first cross-chain transaction data to obtain second cross-chain transaction data;

storing second cross-chain transaction data corresponding to the second transaction event of the cross-chain transaction to the second blockchain, the second cross-chain transaction data indicating that the second transaction event is already executed on the second blockchain;

obtaining, at the second gateway device, the second cross-chain transaction data from the second blockchain;

receiving, at the second gateway device, the second cross-chain transaction data from the second blockchain and a digital signature of the second cross-chain transaction data from the second verification node device, respectively;

sending, at the second gateway device, the second cross-chain transaction data and the digital signature of the second cross-chain transaction data to the first gateway device;

obtaining, by the first node device, the second cross-chain transaction data from the second blockchain based on the first cross-chain transaction data through the first gateway device; and sending, by the first node device, a transaction completion response to the terminal through the first service contract and the first cross-chain contract, the transaction completion response indicating that the cross-chain transaction is already completed.

5. The blockchain system according to claim 4, wherein the sending, by the first node device, a transaction completion response to the terminal through the first service contract and the first cross-chain contract comprises:

running the first cross-chain contract again based on the second cross-chain transaction data;

sending the second cross-chain transaction data to the first service contract through the first cross-chain contract that is run again; and running the first service contract again to send the transaction completion response to the terminal.

6. The blockchain system according to claim 5, wherein the method further comprises:

before running the first cross-chain contract again based on the second cross-chain transaction data, receiving a digital signature for the second cross-chain transaction data, the digital signature indicating that the second cross-chain transaction data is already stored to the second blockchain; and sending the second cross-chain transaction data to the first service contract when a quantity of digital signatures for the second cross-chain transaction data is greater than a first threshold.

7. A non-transitory computer-readable storage medium, storing at least one computer program that, when executed by a computer network system acting as a blockchain system including a first node cluster, a second node cluster and a registration device, wherein the first node cluster includes a first plurality of node devices, a first gateway device, and a first verification node device, and the second node cluster includes a second plurality of node devices, a second gateway device, and a second verification node device, the first plurality of node devices in the first node cluster maintaining a first blockchain and the second plurality of node devices in the second node cluster maintaining a second blockchain, causes the blockchain system to perform a cross-chain transaction processing method including:

receiving, at a first node device in the first node cluster, a cross-chain transaction request of a terminal, the cross-chain transaction request including transaction information of a cross-chain transaction, an identifier of a first service contract on the first blockchain, and an identifier of a second service contract on the second blockchain, and the transaction information including positions of to-be-modified data on the first blockchain and the second blockchain and modified data of the to-be-modified data on the first blockchain and the second blockchain;

running, at the first node device, a first service contract on the first blockchain based on the cross-chain transaction request, wherein the first service contract indicates a first execution manner for the cross-chain transaction on the first blockchain, further including:

obtaining the first service contract from the first blockchain based on the identifier of the first service contract on the first blockchain;

inputting the cross-chain transaction request to the first service contract as an input parameter;

executing, through the first service contract, a first transaction event of the cross-chain transaction to obtain first cross-chain transaction data, the first cross-chain transaction data including the identifier of the second service contract on the second blockchain;

calling a first cross-chain contract on the first blockchain to determine a second transaction event of the cross-chain transaction to be performed at the second blockchain, wherein the first cross-chain contract indicates a second execution manner for the cross-chain transaction on the second blockchain; and storing the first cross-chain transaction data to the first blockchain through the first service contract, the first cross-chain transaction data indicating that the first transaction event is already executed on the first blockchain;

receiving, at the first gateway device, the first cross-chain transaction data from the first blockchain and a digital signature of the first cross-chain transaction data from the first verification node device, respectively;

sending, at the first gateway device, the first cross-chain transaction data and the digital signature of the first cross-chain transaction data to the second gateway device;

receiving, at the second node device, the first cross-chain transaction data and the digital signature of the first cross-chain transaction data from the second gateway device;

running, at the second node device, a second cross-chain contract on the second blockchain in the second execution manner corresponding to the second transaction event of the cross-chain transaction in accordance with the first cross-chain transaction data and the digital signature of the first cross-chain transaction data, further including:

obtaining the second service contract from the second blockchain based on the identifier of the second service contract on the second blockchain;

verifying validity of the first cross-chain transaction data of the cross-chain transaction on the second blockchain based on the digital signature of the first cross-chain transaction data;

executing the second cross-chain contract of the second blockchain based on the first cross-chain transaction data;

executing, through the second service contract, the second transaction event of the cross-chain transaction based on the first cross-chain transaction data to obtain second cross-chain transaction data;

storing second cross-chain transaction data corresponding to the second transaction event of the cross-chain transaction to the second blockchain, the second cross-chain transaction data indicating that the second transaction event is already executed on the second blockchain;

obtaining, at the second gateway device, the second cross-chain transaction data from the second blockchain;

receiving, at the second gateway device, the second cross-chain transaction data from the second blockchain and a digital signature of the second cross-chain transaction data from the second verification node device, respectively;

sending, at the second gateway device, the second cross-chain transaction data and the digital signature of the second cross-chain transaction data to the first gateway device;

obtaining, by the first node device, the second cross-chain transaction data from the second blockchain based on the first cross-chain transaction data through the first gateway device; and sending, by the first node device, a transaction completion response to the terminal through the first service contract and the first cross-chain contract, the transaction completion response indicating that the cross-chain transaction is already completed.

8. The non-transitory computer-readable storage medium according to claim 7, wherein the sending, by the first node device, a transaction completion response to the terminal through the first service contract and the first cross-chain contract comprises:

running the first cross-chain contract again based on the second cross-chain transaction data;

sending the second cross-chain transaction data to the first service contract through the first cross-chain contract that is run again; and running the first service contract again to send the transaction completion response to the terminal.

* * * * *